April 8, 1947.    J. BRESLAV    2,418,693
INDUSTRIAL TRUCK
Filed Oct. 10, 1945    2 Sheets-Sheet 1
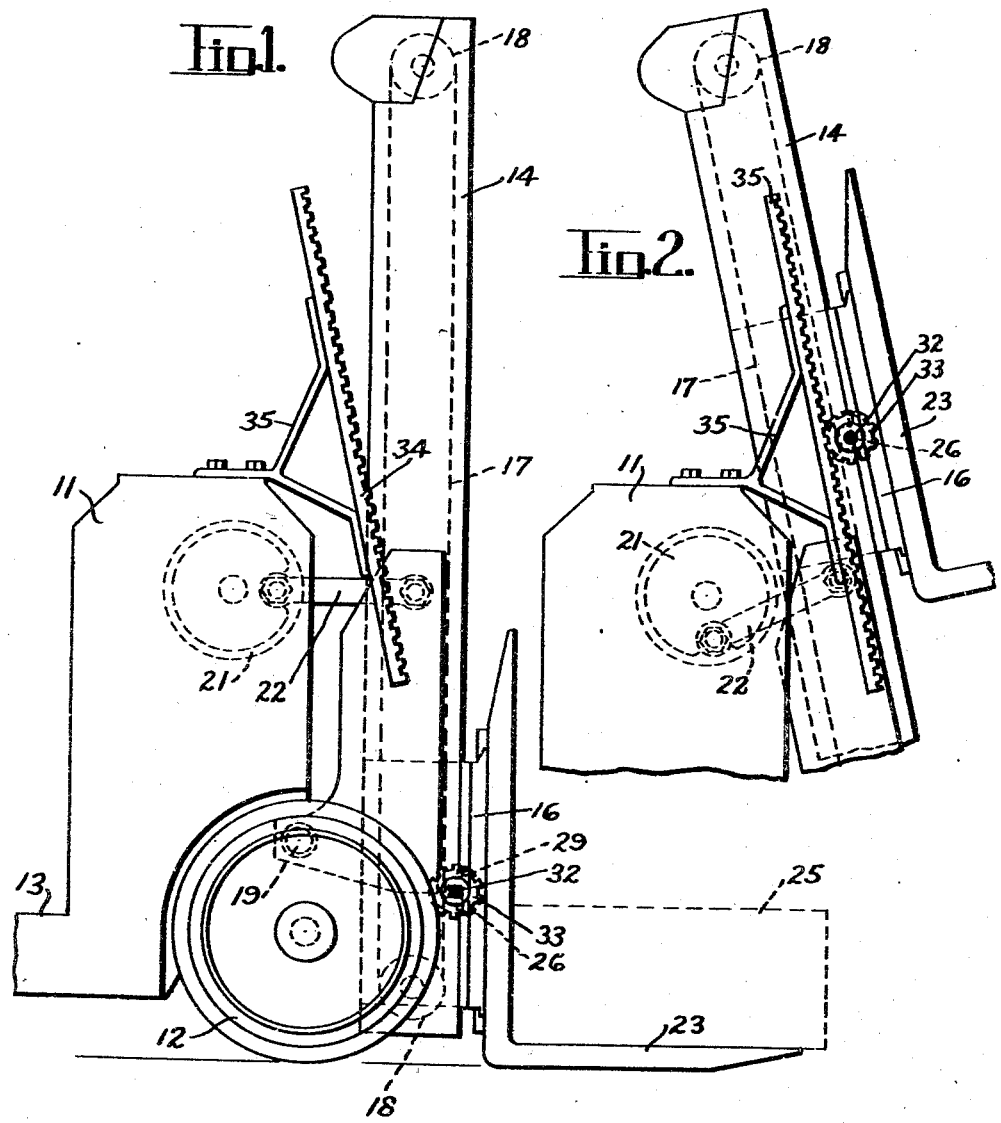
INVENTOR.
Jack Breslav
BY
Walter S. Edwards
ATTORNEY April 8, 1947.　　　J. BRESLAV　　　2,418,693
INDUSTRIAL TRUCK
Filed Oct. 10, 1945　　　2 Sheets-Sheet 2
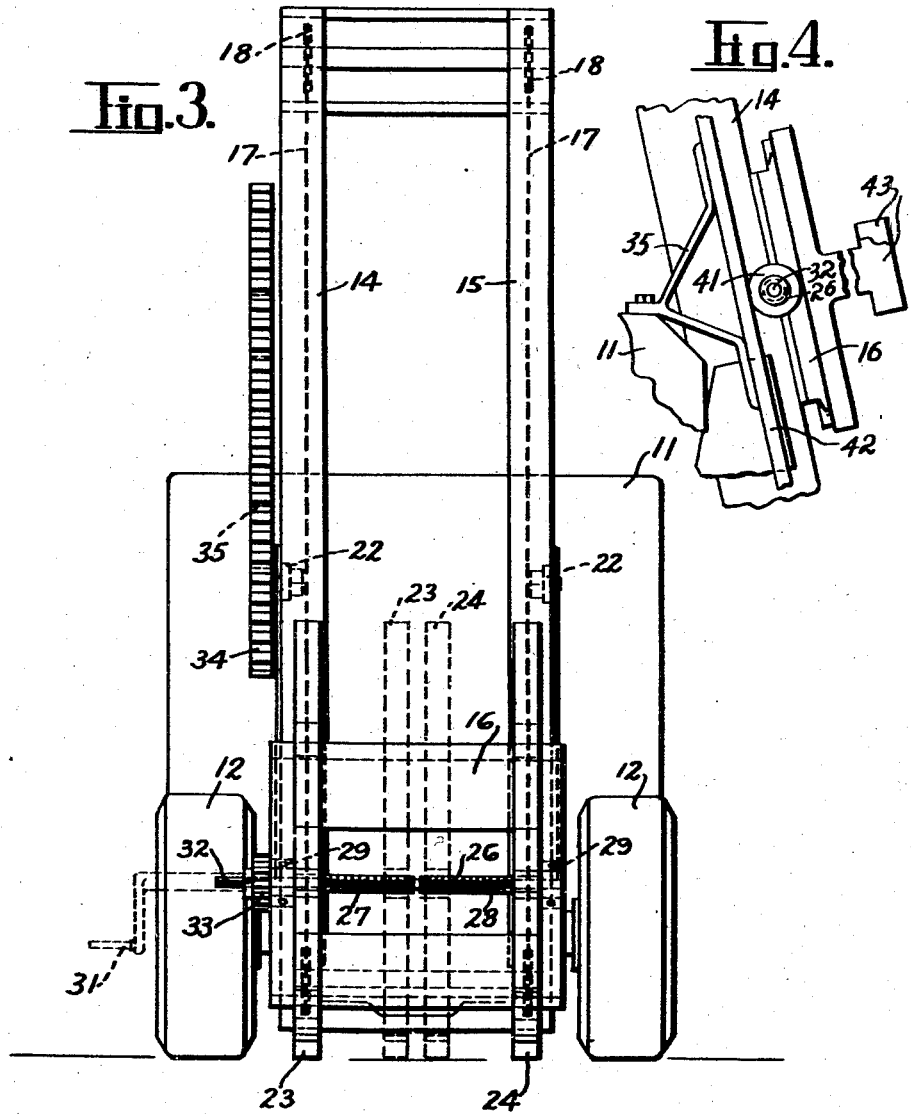
INVENTOR.
Jack Breslav
BY
ATTORNEY Patented Apr. 8, 1947

2,418,693

UNITED STATES PATENT OFFICE 2,418,693

INDUSTRIAL TRUCK

Jack Breslav, New Haven, Conn.

Application October 10, 1945, Serial No. 621,411

12 Claims. (Cl. 214—113)

This invention relates to trucks and more particularly to industrial lift and elevating trucks adapted to pick up loads and transport the same to required locations. Such trucks are usually provided with load engaging forks, rams or grabs and are adapted to raise the load from its support, or the support with its load from the floor, transport the same to another location, and then lower, or elevate, the load to the desired level for disposition thereof in the new location.

As loads vary in width it is advantageous to have the forks capable of being moved laterally to properly engage and support the load, or to move load grabbing arms laterally to properly grip and support the load and it is one object of this invention to provide means, in a truck of the above nature, to move the load engaging and supporting members laterally in a new and useful manner.

Another object is to provide means in an industrial truck to move the load engaging members laterally toward and away from each other by the use of the load lifting mechanism of the truck as the operating means.

A further object of this invention is to provide in an industrial truck improved means to actuate the load engaging and lifting mechanism thereof which will be relatively inexpensive to manufacture, simple in construction, of few parts, compact, and very efficient and durable in use.

With the above and other objects in view, which will appear as the description proceeds, there has been illustrated in the accompanying drawings a form in which the features and principles of this invention may be conveniently and practically embodied.

In the drawings:

Figure 1 is a side view of the front end of an industrial truck of well-known construction and the novel mechanism, for laterally moving the load engaging and carrying members, of this invention is shown embodied in the structure thereof;

Figure 2 is a broken side view of the truck shown in Figure 1 and illustrates the mechanism of this invention in operable position;

Figure 3 is a front view of the truck and mechanism shown in Figure 1; and

Figure 4 is a side view similar to Figure 2 but showing an industrial truck having a somewhat modified form of the mechanism of this invention.

Referring now to the drawings wherein like reference numerals designate like parts throughout the several views, the numeral 11 denotes the front body portion of an industrial truck of a well-known make which is self-propelled and adapted to move about on wheels 12. The operator usually stands on a platform 13 extending between the front portion 11 and a rear power unit portion (not shown). This form of truck is provided with an elevating mechanism which includes spaced apart vertical frame members 14 and 15, upon which a back plate 16 is adapted to slide. Suitable means, such as chains 17, secured to the back plate 16 and running over sprockets 18, are provided to raise and lower the back plate 16 upon the frame members 14 and 15. The lower sprockets are power driven and under the control of the operator.

The frame members 14 and 15 are arranged to be tilted backwardly by being pivoted adjacent their lower ends on a pivot rod 19 supported by the truck portion 11. A crank disc 21, which is hand or power driven by the operator, acts through an arm 22 to tilt the frame members 14 and 15 out of their vertical position. Figure 1 illustrates the vertical position and Figure 2 the tilted position of the frame members 14 and 15. Load engaging members, or legs, 23 and 24 herein shown in the form of forks, are provided and are adapted to be slid under the load 25 by forward movement of the truck on its wheels 12. The legs 23 and 24 are separately supported upon the back plate 16 for lateral sliding movement toward and away from each other. Obviously various forms of legs may be provided to suit different forms of loads to be engaged and lifted.

It is particularly advantageous to adapt the legs 23 and 24 to be moved transversely on the back plate 16 to adjust them for properly engaging loads of various widths. A mechanism embodying the features and principles of this invention is herein illustrated and comprises a right and left hand threaded shaft 26. The right hand threaded portion 27 of the shaft 26 is in threaded engagement with the leg 23 and the left hand threaded portion 28 is in threaded engagement with the leg 24. Rotation of the shaft 26, which is journaled at each end in pillow blocks 29 secured to the back plate 16, will slide the legs 23 and 24 upon the back plate 16 toward or away from each other. Load gripping jaws 43 (see Figure 4) could be substituted for the fork form of the legs 23 and 24 and actuated to grip the load between them by proper rotation of the threaded shaft 26. For manual rotation of the shaft 26 a handle (see 31 in dotted lines in Figure 3) may be engaged with an extending end 32 provided on the shaft 26.

For the purpose of laterally adjusting the legs 23 and 24 mechanically, a gear pinion 33, or friction disc 41 (see Figure 4), is secured to an end of the shaft 26 in vertical alignment with a gear rack 34, or friction bar 42 of Figure 4. The rack 34, or bar 42, is positioned and secured to the truck front portion 11 by means of a bracket 35 and is tilted out of the vertical a sufficient amount to insure meshing of the gear pinion, or frictional contact of the friction disc, therewith when the back plate 16 has been raised and tilted with the frame members 14 and 15 as shown in Figure 2. Raising or lowering movement of the back plate 16, after it has been disposed in tilted position sufficient to cause meshing of the pinion 33 and the rack 34 or the disc 41 with the bar 42, will rotate the shaft 26 to move the legs 23 and 24 toward or away from each other to adjust them to suit the load to be engaged and lifted. Thus the operator, after using the truck for transporting one size of load may adjust the legs 23 and 24 for another size of load without leaving his position on the platform 13 to manually adjust them, or by actuating them by operation of a separate motor connected to the shaft 26. If a friction disc 41 and bar 42 arrangement is used, control of the friction by the operator is possible by varying the pressure between these parts when tilting the frame and plate members, thus in the case load gripping jaws 43 (see Figure 4) are used, in place of forks, the pressure on the load being engaged can be controlled.

While there has been shown and described herein one form in which the features and principles of this invention may be embodied, it is to be understood that they may be embodied in other specific forms without departing from the spirit and essential attributes thereof, and it is therefore desired that the present embodiment be considered in all respects as illustrative and not restrictive, reference being had to the claims rather than to the foregoing description to indicate the scope of the invention.

Having thus fully disclosed the invention, what is claimed as new and for which it is desired to secure Letters Patent is:

1. In a truck having a stationary portion, a tiltable load carrying frame, and load engaging members movable lengthwise of the frame and movable laterally of the frame toward and away from each other, mechanism to laterally move the members including a rotatable part connected to the members to move them laterally upon being rotated and being carried thereby for lengthwise movement therewith, a second part secured to and rotatable with said rotatable part, and a third part connected to the stationary portion of the truck in position to be engaged by the second part, when the frame is tilted, to rotate the second part and by it the rotatable part upon lengthwise movement of the load engaging members in respect to the frame.

2. In a truck having a stationary portion, a tiltable frame, a back plate slidable on the frame lengthwise thereof, load engaging members carried by the back plate and slidable thereon laterally of the frame toward and away from each other, rotatable means adapted to act on the members to slide them laterally when it is rotated, means to rotate said rotatable means including a member connected to and carried by said rotatable means, and means on said stationary frame portion positioned to be engaged by said member when the frame is tilted and to rotate the member and through it said rotatable means when engaged by said member and the back plate is slid lengthwise on the frame.

3. In a truck having a stationary portion, a tiltable load carrying frame and load engaging members movable lengthwise of the frame and movable laterally of the frame toward and away from each other, mechanism to laterally move the members including a threaded shaft in threaded engagement with said members to move them when rotated, and means to rotate said shaft comprising a gear pinion on the shaft, and a gear rack on said stationary frame portion positioned to be engaged by said pinion when the frame is tilted toward the gear rack.

4. In a truck having a stationary portion, a tiltable frame, a back plate slidable on the frame lengthwise thereof, load engaging members carried by the back plate and slidable thereon laterally of the frame toward and away from each other, mechanism to laterally move said members including a threaded shaft carried by said back plate and being in threaded engagement with said members to move them when it is rotated, a disc on said shaft to rotate it when the disc is rotated, and a disc rotating means on said stationary truck portion positioned to be frictionally engaged by said disc when the frame is tilted toward the stationary truck portion and to rotate said disc when engaged therewith and the back plate is moved lengthwise of the frame.

5. In a truck, laterally spaced apart frame members, a back plate slidable lengthwise of and on said frame members, load engaging legs carried by said back plate and slidable thereon laterally of said frame members, means to move said legs toward and away from each other, means to move the back plate lengthwise of the frame, means to tilt the frame, and mechanism for actuating said leg moving means including a part carried by said back plate and a stationary part, said parts being operably engageable when the frame is tilted toward the stationary part, and actuated, when so engaged, by movement of the back plate lengthwise of the frame to move the legs.

6. In a truck, a tiltable frame, load engageable legs slidably supported on said frame for movement lengthwise thereof, rotatable means to move the legs laterally in respect to the frame when rotated, means to rotate said leg moving rotatable means when the frame is tilted and the legs are moved lengthwise thereof including a disc connected to the leg moving rotatable means to rotate the latter when the disc is rotated, and an elongated stationary member operably and frictionally engaged by the disc when the frame is tilted toward the stationary member.

7. In a truck, a tiltable frame, load engageable legs slidably supported on said frame for movement lengthwise thereof, rotatable means to move the legs laterally in respect to the frame when rotated, means to rotate said leg moving rotatable means when the frame is tilted and the legs are moved lengthwise thereof including a gear pinion connected to the leg moving rotatable means of a gear rack positioned to be operably engaged by the gear pinion when the frame is tilted toward the gear rack.

8. In a truck, laterally movable load engaging members, a rotatable threaded shaft threadingly connected to said members to laterally move them toward and away from each other when rotated, a stationary elongated part secured to the truck, a friction disc on said shaft to rotate it when the disc is rotated, said disc being frictionally engageable with said stationary part to be rotated when moved therealong in engagement therewith, means to move said disc into operable engagement with said part, and means to move said disc along said part.

9. In a truck, laterally movable load engaging members, a rotatable threaded shaft threadingly connected to said members to laterally move them toward and away from each other when rotated, a stationary elongated gear rack secured to the truck, a gear pinion on said shaft and operably engageable with said rack to be rotated when moved lengthwise therealong, means to move said gear into engagement with said rack, and means to move the gear along said rack.

10. In a truck, a tiltable frame, load engaging members movable lengthwise of said frame, a rotatable member adapted to move said members laterally of said frame toward and away from each other when rotated, a disc connected to said rotatable member to rotate it when the disc is rotated, an elongated stationary part secured to the truck and positioned to be frictionally engaged by said disc and to rotate it when the disc is moved therealong to rotate the leg moving rotatable member, means to tilt the frame to operably and frictionally engage the disc with the stationary part, and means to move the load engaging members lengthwise of the frame when the latter is tilted to move the disc along in engagement with the stationary member to be rotated thereby.

11. In a truck of the type described, a tiltable frame, load engaging legs movable lengthwise of the frame and laterally thereof toward and away from each other, mechanism for moving the legs toward and away from each other including a stationary gear rack and a gear pinion drivingly connected to the legs and movable therewith lengthwise of the frame, said gear rack and said gear pinion being positioned to operably engage when said frame is tilted toward the stationary gear rack, to rotate said gear pinion upon movement of said legs lengthwise of said frame.

12. In a truck having a frame tiltable toward a stationary truck part, load engaging members movable laterally on said frame toward and away from each other and lengthwise of said frame, and a screw-threaded shaft threadingly engaging each of said load engaging members to laterally move them when rotated, means to rotate said shaft comprising cooperating elements between said shaft and said stationary truck part adapted to be drivingly connected for actuation when the frame is tilted toward the stationary truck part and the load engaging members are moved lengthwise on the frame, means to tilt the frame, and means to move the load engaging members lengthwise on the frame.

JACK BRESLAV.

REFERENCES CITED

The following references are of record in the file of this patent:

UNITED STATES PATENTS

| Number | Name | Date |
| --- | --- | --- |
| 508,691 | Fiske | Nov. 14, 1893 |
| 1,813,596 | Abbe | July 7, 1931 |
| 1,813,597 | Abbe | July 7, 1931 |
| 1,884,356 | Stuckey | Oct. 25, 1932 |
| 2,339,120 | Ulinski | Jan. 11, 1944 |